United States Patent Office 3,485,859
Patented Dec. 23, 1969

3,485,859
SEPARATING TERTIARY PHOSPHINES
FROM OLEFINS
Werner Reif, Ludwigshafen (Rhine), Peter Haug, Bad Duerkheim, and Herwig Freyschlag and Horst Pommer, Ludwigshafen (Rhine), Germany, assignors to Badische Anilin- & Soda-Fabrik Aktiengesellschaft, Ludwigshafen (Rhine), Germany
No Drawing. Filed Aug. 19, 1966, Ser. No. 573,480
Claims priority, application Germany, Aug. 26, 1965, 1,518,590
Int. Cl. C11c 3/00; C07c 67/06
U.S. Cl. 260—410                       9 Claims

ABSTRACT OF THE DISCLOSURE

Separation of small amounts of tertiary phosphines from olefins or substituted olefins having at least eight carbon atoms by treating a solution thereof in a water-insoluble solvent with an aqueous solution of a peroxide to form tertiary phosphine oxides, and separating the latter from the olefins.

---

The present invention relates to a method of separating small amounts of tertiary phosphines having the general Formula I:

in which $R^1$, $R^2$ and $R^3$ denote aliphatic, cycloaliphatic, araliphatic or aromatic hydrocarbon radicals having one to eight carbon atoms and preferably the phenyl group, from olefins having the general Formula II:

in which $R^4$, $R^5$, $R^6$ and $R^7$ denote hydrogen atoms or saturated or unsaturated aliphatic, cycloaliphatic, araliphatic or aromatic radicals, the total number of carbon atoms in (II) being at least eight, and in which $R^4$ and $R^5$ and also $R^6$ and $R^7$ may be combined to form a five-membered to eight-membered ring.

While large amounts of phosphines (I) may be removed from the olefins (II) by distillation, extraction or crystallization, it is extremely difficult to separate small amounts of (I) from (II) by these methods without too expensive equipment.

The problem of freeing olefins (II) from tertiary phosphine oxides having the general Formula III:

is similar although not quite so difficult.

The object of the present invention is to free olefins (II) from tertiary phosphines (I) in order to obtain them in pure or analytically pure form.

We have found that this object can be achieved by treating water-insoluble organic solutions of the mixture of the tertiary phosphine (I) and the olefin (II) with aqueous solution of peroxides so that a tertiary phosphine oxide (III) is formed from the tertiary phosphine (I), and then separating the tertiary phosphine oxide (III) from the olefins (II) by a conventional method.

The purification method according to this invention is suitable particularly for removing triphenyl-phosphine, which serves mainly as a reactant in the Wittig synthesis, from the products obtained by the said synthesis, namely olefins (II), but is also suitable for the removal of other tertiary phosphines having radicals according to the above definition, for example tritolylphosphines, triethylphosphine, triisopropylphosphine, tricyclohexylphosphine, and phosphines having different radicals, such as diphenyltolylphosphines or diphenylxylylphosphines.

These tertiary phosphines (I) may be separated for example from the following olefins (II): linalool, dehydrolinalool, α-ionone, β-ionone, vitamin $A^1$ acetate, vitamin $A^1$ palmitate, vitamin $A^1$ acid ethyl ester, vitamin $A^1$ aldehyde, vitamin $A^2$ acetate, vitamin $A^2$ acid ethyl ester, axerophthene, β-apo-12'-carotenal, β-apo-12'-carotenal acetate, β-apo-12'-carotenic acid ethyl ester, β-apo-8'-carotenal, β-apo-8'-carotenal acetate, β-apo-8'-carotenic acid ethyl ester, α-carotene, β-carotene, lycopene, farnesylacetone and isophythol.

Examples of the radicals $R^4$, $R^5$, $R^6$ and $R^7$ are alkyl groups having one to twenty-two carbon atoms, mono- or polyunsaturated alkenyl groups having two to twenty-two carbon atoms, mono- or polyunsaturated alkynyl groups having two to twenty-two carbon atoms, cycloalkyl groups having five to twelve ring members which may contain alkyl, alkenyl and alkynyl cycloalkyl groups containing the same and having up to twenty-two carbon atoms, the phenyl group and alkylphenyl, alkenylphenyl, alkynylphenyl groups and phenylalkyl, phenylalkenyl and phenylalkynyl groups having seven to twenty-two carbon atoms.

The olefins may be either pure hydrocarbons or may contain in the molecule one to two ester or ether groupings or nitrile, carbonyl or hydroxyl groups.

According to the observations we have made so far, the success of the process according to this invention is not dependent on the chemical constitution.

The process is of particular importance for preparing pure compounds which have to be free from physiologically harmful impurities in view of their intended use, for example perfumes, vitamin A and its derivatives and foodstuff dyes of the carotenoid series. Most of these compounds belong to the class of polyenes having eight to forty carbon atoms which may also contain the above-mentioned groups. The phosphorous content may be immediately decreased to 0.01% or less in this way.

Particularly suitable water-insoluble organic solvents for the mixtures of (I) and (II), which as a rule also contain (III), are (having regard to the preferred extractive separation of (III)) chiefly aliphatic hydrocarbons having five to twenty-five carbon atoms, such as petroleum ether, light naphtha, ligroin, octane, isooctane, gasoline, paraffin oils and also cycloaliphatic hydrocarbons such as cyclohexane and cyclooctane; aromatic hydrocarbons, such as benzene and toluene; haloaliphatic hydrocarbons, such as methylene chloride, chloroform and carbon tetrachloroide. Mixtures of these solvents are also suitable.

It is preferable to prepare 0.1 to 30% solutions of the substances to be purified in these solvents.

Inorganic or organic compounds having a —O—O— grouping, such as hydrogen peroxide, sodium peroxide, Caro's acid (permonosulfuric acid), persulfuric acid, peracetic acid and perbenzoic acid, as well as the salts of these acids, preferably the alkali metal salts, are suitable as peroxides.

It is preferred to use neutral to weakly acid aqueous 0.1 to 10% solutions of the water-soluble peroxides.

In the preferred pH range of 2 to 7, particularly 4 to 5, a definite pH value may be set up by means of buffer substances such as acetate or phosphate buffer systems.

In all cases the amount of peroxide used should be at least equivalent to the amount of (I) to be oxidized. A stoichiometric excess of the peroxide is not deleterious and as a rule up to twice to three times the molar amount of (II) is even desirable to accelerate the reaction.

Since the success of the process according to this invention is independent of the temperature within the range of 0° to 30° C., it is preferred for practical reasons to carry it out at room temperature. Sometimes it is advisable however to use higher or lower temperatures to accelerate or moderate the reaction. This depends among other things on the amount of phosphine to be oxidized and also on the thermal sensitivity of the olefin. Optimum reaction conditions can easily be determined by a simple experiment.

A particular embodiment of the process according to the invention consists in the use of insoluble redox resins having peroxide groups.

These resins are obtained for example by chlorination of the sulfonic groups or carboxyl groups of acid ion-exchange resins followed by reaction of these resins with sodium peroxide. If the solution of (II) does not wet the resin (which as a rule is swollen with water) satisfactorily, it is advisable to free the resin from water by conventional methods and to swell it with a suitable organic liquid prior to use. It is often sufficient however to add a water-soluble solvent, for example methanol or isopropanol, to the solution of (II) in order to improve wettability.

The peroxides may be allowed to act on the organic solutions which contain the mixtures of substances (I) and (II) by all known methods and in all appropriate apparatus, either batchwise or continuously, if desired under an atmosphere of inert gas. When the process is carried out on an industrial scale it is preferred to use the continuous method, for example the action of an aqueous peroxide solution on an organic solution of a mixture of (I) and (II) by a countercurrent method or the oxidation of (I) to (II) in a peroxide synthetic resin column.

The starting material is as a rule a prepurified mixture of (I) and (II), i.e. a mixture containing a predominant amount of (II). The remainder consists of (I), together with (III) which is usually already present and possibly other impurities which are either not troublesome or are removed in another way.

The phosphine oxides (III) obtained in the present process may be separated by conventional methods or by extraction with a water-soluble solvent.

Suitable organic solvents are those already specified, while the water-soluble solvents may be for example methanol, ethanol, isopropanol, acetone, acetonitrile, dimethylformamide or dimethyl sulfoxide or mixtures of these solvents and especially mixtures with up to 80% by volume of water.

Suitable pairs of solvents (with the mixing ratio given in parts by volume) are as follows:

Hexane, heptane, octane, nonane and/or decane with methanol and water in the ratio 95:5 to 30:70, preferably from 80:20 to 40:60
Isooctane with ethanol and water in the ratio 60:40
Light naphtha with methanol and water in the ratio 85:15
Cyclohexane with acetone and water in the ratio 80:20 to 40:60
Paraffin oil with dimethylformamide and water in the ratio 80:20 to 20:80
Methylcyclohexane, cyclooctane, ligroin and/or toluene with methanol and water in the ratio 50:50

It is preferred to extract a 0.1 to 30% solution of the contaminated olefin with 0.1 to 20 times the amount of extractant. The content of phosphine oxide is between about 0.1 and 5% by weight on the amount of olefin. In general it is advisable to carry out the extraction at room temperature but in the case of sensitive olefins temperatures of down to −20° C. are sometimes more advantageous. To achieve equilibrium more rapidly, it is also possible to use higher temperatures, for example up to +60° C.

All the methods and apparatus available in the art may be used for the extraction itself, for example it may be done batchwise by shaking, semicontinuously by means of Craig distribution or preferably completely continuously by the countercurrent method, in each case in an atmosphere of inert gas, if desired.

The degree of purity of the olefins in respect of tertiary phosphines (I) and in respect of the tertiary phosphine oxides (III) formed may be determined chromatographically or spectroscopically. The good result of the process according to this invention may be regarded as surprising because it would not have been expected that the double bond of the olefins (which are as a rule very sensitive) would not be attacked to an appreciable extent by the peroxides.

The invention is illustrated by the following examples.

EXAMPLE 1

A solution of 800 g. of octane and 100 g. of crude vitamin A acid ethyl ester (which contains 1.5% of phosphorus, mainly as triphenylphosphine) is shaken for half an hour at 20° C. with 1 liter of a 10% aqueous solution of potassium hydrogen permonosulfate ($KHSO_5$) which has a pH value of 4.

Then the organic phase is shaken up twice at 20° C., each time with 1 liter of a mixture of methanol and water in the volumetric ratio 9:1 and then freed from solvent.

The phosphorus content of the vitamin A acid ethyl ester phase thus purified has been decreased to less than 0.001%.

EXAMPLE 2

A solution of 800 g. of cyclohexane and 100 g. of crude vitamin A acetate (which contains about 1% of phosphorus mainly as triphenylphosphine) is stirred intensely for half an hour at 20° C. with 1 liter of aqueous 3% hydrogen peroxide solution which has been adjusted with acetic acid to a pH value of 4.5.

The organic phase is then extracted five times at 20° C. with a mixture of 600 ml. of ethanol and 400 ml. of water. The vitamin A acetate phase remaining after cyclohexane has been removed contains less than 0.001% of phosphorus.

EXAMPLE 3

A solution of 1800 g. of light naphtha (boiling point range 80° to 100° C.) and 200 g. of crude vitamin A palmitate (which contains 0.8% of phosphorus, mainly as triphenylphosphine) is washed continuously at 20° C. in an extraction apparatus having about five theoretical separating stages with 2 liters of 2% aqueous permonosulfuric acid countercurrently.

The light naphtha phase is then extracted continuously in the same apparatus with a mixture of 1800 ml. of methanol and 200 ml. of water at 20° C. The phosphorus content of the vitamin A palmitate phase has fallen to less than 0.001%.

EXAMPLE 4

A solution of 180 g. of octane and 30 g. of crude vitamin A acetate (containing 1.3% of phosphorus, mainly as triphenylphosphine) is intensely stirred for an hour at 20° C. with 600 g. of a peroxide redox resin. The octane solution is then separated and the resin is washed three times, each time with 100 g. of octane.

The combined octane solutions are extracted five times at 20° C., each time with 500 ml. of a mixture of 450 ml. of methanol and 50 ml. of water. The phosphorus content of the vitamin A acetate phase is then less than 0.001%.

The redox resin is prepared as follows:

1000 g. of an acid ion exchanger containing carboxylic groups is freed from adherent water by washing with ethanol and then with benzene and is then chlorinated in suspension in benzene with 1000 g. of thionyl chloride. The chlorinated resin is then reacted in the course of about twenty hours at 0° C. with a solution of 400 g. of sodium peroxide and 3080 g. of water, separated from the water, suspended at 0° C. in 4 liters of 10% sulfuric acid and, after the replacement of the sodium cations by protons, washed with water until the effluent water is neutral. The bulk of the water is then expelled first by ethanol and the ethanol by octane.

We claim:
1. A process for separating small amounts of tertiary phosphines having the general Formula I:

in which $R^1$, $R^2$ and $R^3$ denote aliphatic, cycloaliphatic, araliphatic or aromatic hydrocarbon radicals having one to eight carbon atoms, from olefins having the general Formula II:

in which $R^4$, $R^5$, $R^6$ and $R^7$ denote hydrogen atoms or saturated or unsaturated aliphatic, cycloaliphatic, araliphatic or aromatic hydrocarbon radicals, or the aforesaid hydrocarbon radicals containing in the molecule 1–2 ester or ether groups, or carbonyl or hydroxyl substituents, the total number of carbon atoms in compound (II) being at least eight, and in which the radicals $R^4$ and $R^5$ and/or $R^6$ and $R^7$ may be combined to form a five-membered to eight-membered ring, wherein a water-insoluble organic solution of the mixture of tertiary phosphines (I) and olefins (II) is treated with an aqueous solution of a peroxide, following which the tertiary phosphine oxides having the Formula III:

formed from the compound (I) are separated from compound (II) by extraction with a water-soluble solvent or a mixture of a water-soluble organic solvent and water containing up to 80% by volume of water.

2. A process as claimed in claim 1 wherein $R^1$, $R^2$ and $R^3$ denote phenyl groups.

3. A process as claimed in claim 1 wherein the water-insoluble solution containing the compounds (I) and (II) is treated with a neutral or weakly acid aqueous solution of a water-soluble peroxide.

4. A process as claimed in claim 1 wherein the water-insoluble solution containing the compounds (I) and (II) is treated with a redox resin bearing peroxide groups.

5. A process as claimed in claim 1 carried out continuously.

6. A process as claimed in claim 1 wherein the water-insoluble organic solution contains 0.1 to 30% of the substance to be purified.

7. A process as claimed in claim 1 wherein the treatment with peroxide is carried out at a pH value of 2 to 7.

8. A process as claimed in claim 7 wherein the pH value is 4 to 5.

9. A process as claimed in claim 1 wherein the peroxide is used in an excess over the stoichiometric amount.

References Cited

UNITED STATES PATENTS 2,917,523   12/1959   Pommer _____ 260—410.9

LORRAINE A. WEINBERGER, Primary Examiner

R. WEISSBERG, Assistant Examiner

U.S. Cl. X.R.

260—410.9, 499, 587, 598, 617, 631.5, 666

PO-1050
(5/69)

UNITED STATES PATENT OFFICE
CERTIFICATE OF CORRECTION

Patent No. 3,485,859  Dated December 23, 1969

Inventor(s) Werner Reif et al

It is certified that error appears in the above-identified patent and that said Letters Patent are hereby corrected as shown below:

Column 5, claim 1, formula II, that portion of the formula reading "$R^4-C$" should read '''$R^5-C$'''.

SIGNED AND
SEALED
APR 28 1970

(SEAL)
Attest:

Edward M. Fletcher, Jr.
Attesting Officer

WILLIAM E. SCHUYLER, JR.
Commissioner of Patents